G. E. PALMER.
METER CONNECTION BLOCK.
APPLICATION FILED OCT. 14, 1910.
993,099.
Patented May 23, 1911.
3 SHEETS—SHEET 1.
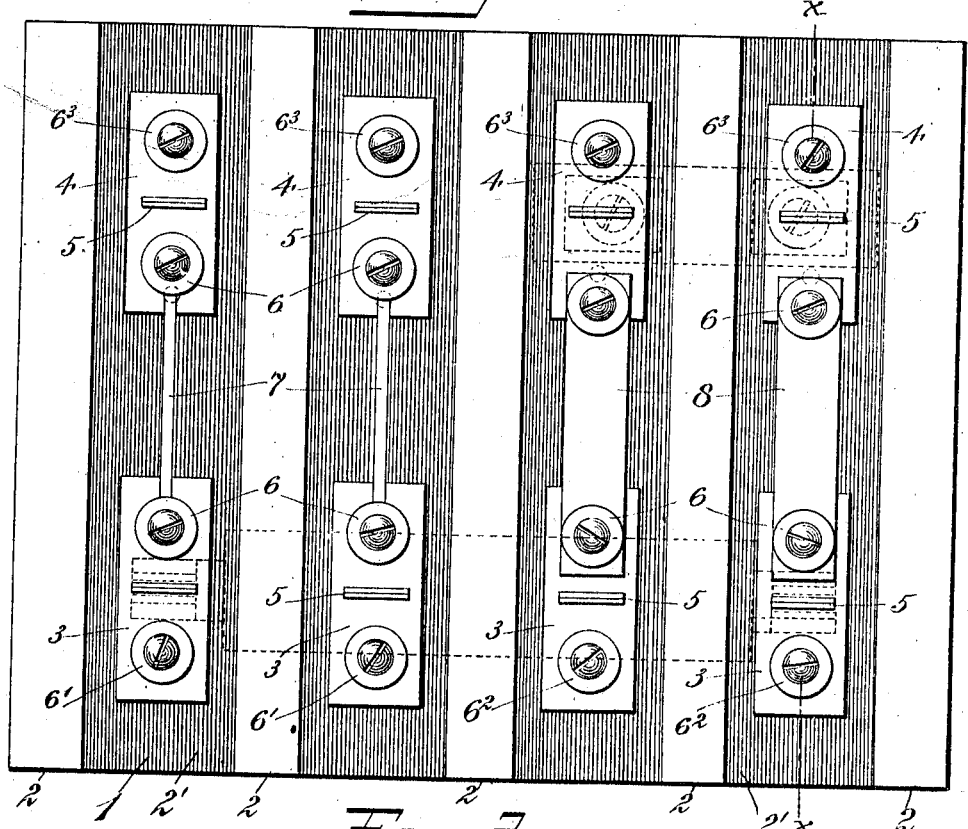
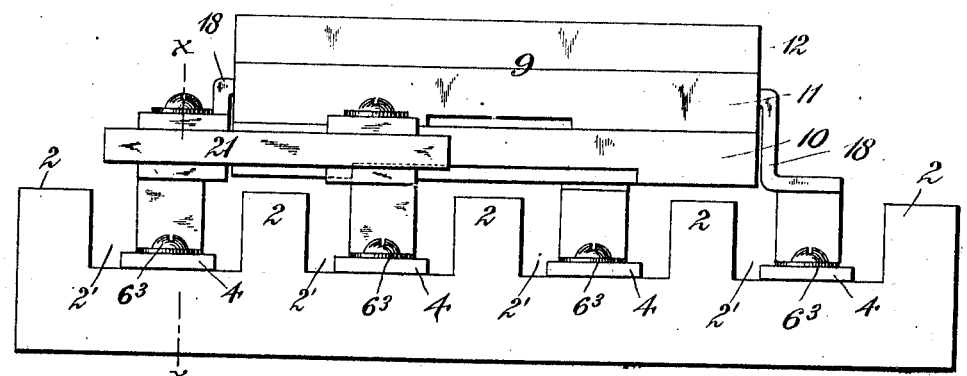
Witnesses:
Fred H. M. Dannenfelser
Chas M Peard
Inventor
G. E. PALMER
By his Attorneys
Bartlett, Brownell Mitchell
N. B. Brownell G. E. PALMER.
METER CONNECTION BLOCK.
APPLICATION FILED OCT. 14, 1910.
993,099.
Patented May 23, 1911.
3 SHEETS—SHEET 2.
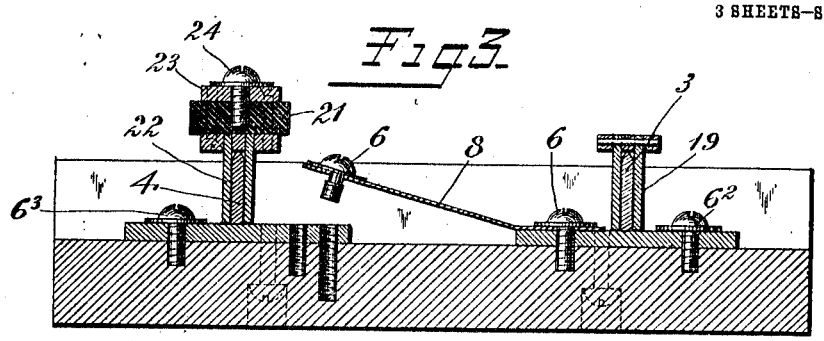
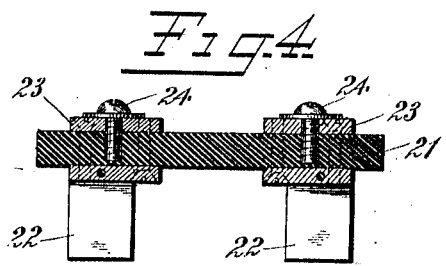
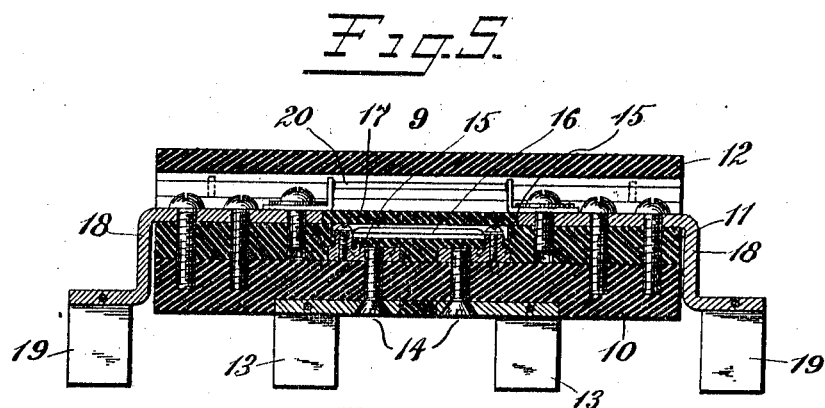
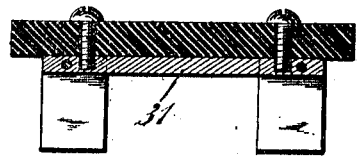

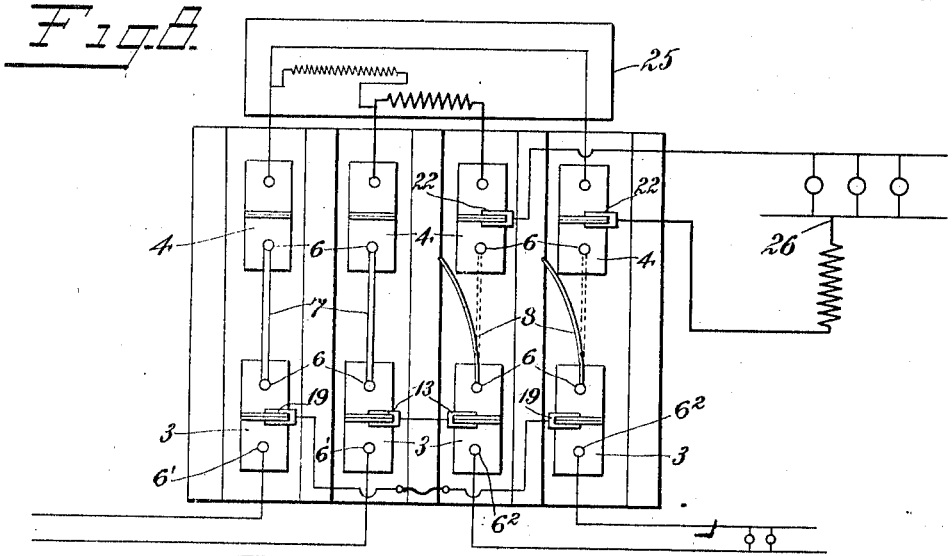
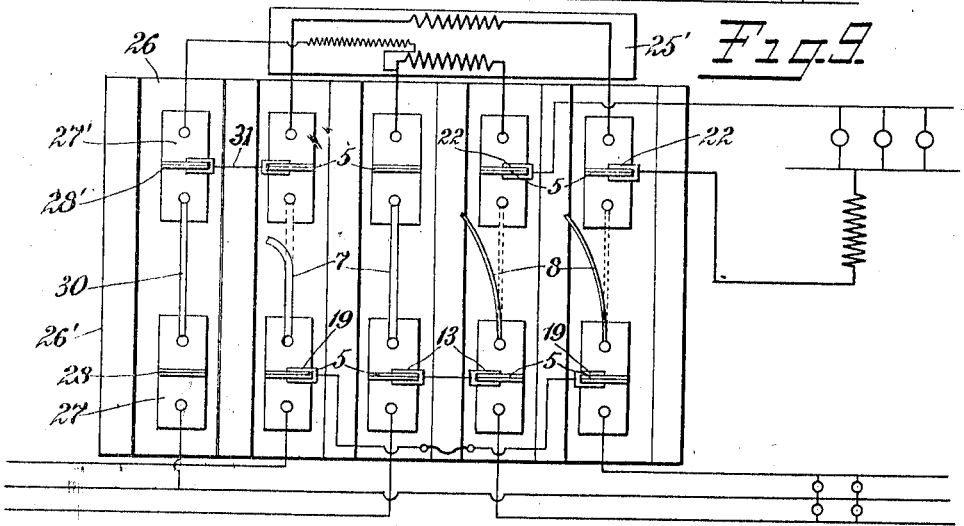
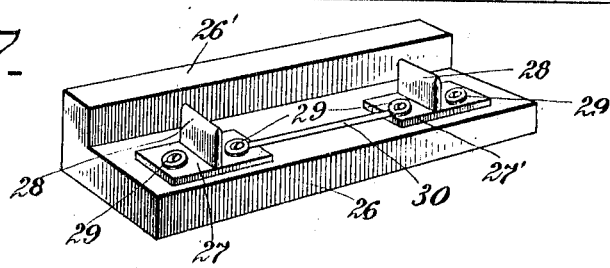

UNITED STATES PATENT OFFICE.

GRANVILLE E. PALMER, OF HARTFORD, CONNECTICUT.

METER CONNECTION-BLOCK.

993,099.  Specification of Letters Patent.  Patented May 23, 1911.

Application filed October 14, 1910.  Serial No. 587,012.

*To all whom it may concern:*

Be it known that I, GRANVILLE E. PALMER, a citizen of the United States, residing at Hartford, county of Hartford, State of Connecticut, have invented certain new and useful Improvements in Meter Connection-Blocks, of which the following is a full, clear, and exact description.

My invention relates to meter connection blocks and has for its object to provide a combined fuse and test connection block suitable for use with either two or three-wire meters, its construction being such that the connections used for test purposes on two-wire meters are also used for testing three-wire meters, thereby simplifying and expediting the making of these test connections.

It further has for its object to provide a combined fuse and connection block suitable for use with three-wire meters in which the potential coil is connected at one end to the neutral main.

The following is a description of the embodiment of my invention, reference being had to the accompanying drawings in which—

Figure 1 is a plan view of the simplest form of my invention, the same being a block suitable for use with either two-wire meters or with three-wire meters, in which the potential coil is connected across the two outside mains, the short circuiting connector and test circuit terminal plug being shown in dotted lines. Fig. 2 is a view of the top side of this block looking toward the top thereof with the short circuiting connector, and the test circuit terminal plug applied thereto, and shown in full lines. Fig. 3 is a vertical section on the lines $x$—$x$ Figs. 1 and 2 with the spring conductors disconnected. Fig. 4 is a longitudinal section of the test circuit terminal plug. Fig. 5 is a longitudinal section of the short circuiting connector. Fig. 6 is a longitudinal section of a supplemental connecting member used with the block in connection with a three-wire meter whose potential coil has one of its ends connected with the neutral main.
Fig. 7 is a perspective view of a supplemental block used with block of Fig. 1 in connection with such three-wire meters. Fig. 8 is a plan view showing diagrammatically the circuit connections when the block is used for testing two-wire meters, or full potential three-wire meters. Fig. 9 is a plan view of the block of Fig. 1 together with the supplemental block of Fig. 7, with the plug and connectors of Figs. 4, 5 and 6 (shown diagrammatically) applied thereto for testing three-wire meters whose potential coils are connected with the neutral main.

Referring more particularly to the drawings, 1 is a base of slate, soap-stone or other similar suitable insulating material having five projecting ridges, 2 forming between them depressed channels 2'. In these channels and adjacent to one end of the base are mounted four terminals 3, the same being preferably in a straight row and constituting the first series of terminals. In these same channels adjacent to the other end of the base are mounted four terminals 4, the same being preferably in a straight row and constituting the second series of terminals. Each of the terminals 3 and 4 has a similar projecting blade or contact surface 5, and on each side of each of said contact surfaces, is a screw clip; 6 are the inner clips; 6' are the outer clips of the two left hand terminals of the first series. $6^2$ are the outer clips of the two right hand terminals of the first series and $6^3$ are the outer clips of the terminals of the second series. The two terminals in each of the depressed channels constitute a pair. These terminals of the two pair on one half of the block are connected by fuses 7. The two pair on the other half of the block are each connected together by conductors 8, preferably copper, the fuses 7 and conductors 8 being secured by the clips 6 on the inner ends of the terminals 3 and 4. The conductors 8 are of spring material and the clip screws securing the same pass therethrough. The said screws have their shanks slightly reduced close to their heads. The holes in the conductors 8 through which the screws pass, are just large enough to permit the screw-threaded portions of the screws to be screwed therethrough, the result being that reduced portions of the screws fit loosely within the holes so that conductors 8 are always free to rise up against the under side, of the screw-heads, and the screws themselves, will be retained within the holes of the conductors even when out of engagement with the terminals 4 (Fig. 3). The spring action of the conductors 8 is such that when the screws passing through the upper ends thereof are disengaged from the terminals 4, the upper ends of the conductors will automatically withdraw from the terminals 4 so that the conductors and their upper retaining screws will be automatically separated therefrom, as shown in Fig. 3.

9 is a short circuiting connector consisting of an insulated body made up of three sections, 10, 11 and 12 (Figs. 2 and 5). To the lower section are secured two metallic inverted U-shaped blades or terminals 13 secured by screws 14 to plates 15, which are electrically connected together by a fuse 16 within a recess of the member 11. This fuse 16 is covered by a removable cover 17, so as to be suitably inclosed. On top of the insulation 11 are secured two conducting members 18 terminating at their lower ends in inverted U-shaped terminals 19, and connected at their upper ends by a fuse 20. The insulating member 12 fits upon the top of the insulating member 11, so as to inclose the upper ends of the members 18, and also inclose the fuse 20. This short circuiting member when in operative position, as shown in dots in Fig. 1 and in full lines in Fig. 2, has its U-shaped terminals 19 in engagement with the similar contact surfaces upon the two outer terminals 3 of the first series as shown in Fig. 3, and its U-shaped terminals 13 in engagement with the similar contact surfaces of the two inner terminals 3 of the first series for the purpose hereinafter stated.

21 is a test circuit terminal plug shown in sectional detail in Fig. 4 consisting of a body of insulation to which are secured two U-shaped blades or terminals 22, which are insulated from each other and electrically connected to plates 23, carrying binding posts 24. This terminal plug when in operative position has its U-shaped terminals 22 in engagement with the contact surfaces of the terminals 4 of the second series, to which the conductors 8 are connected, as shown in dots in Fig. 1 and in full lines in Figs. 2 and 3, and diagrammatically in Figs. 8 and 9, 2 and 3 for the purposes hereinafter stated.

When in normal use the line wires are connected to the clips 6' 6', and the load wires are connected to the clips $6^2$ $6^2$. The four terminals of the meter 25 are connected as shown to the clips $6^3$ of the upper series of terminals, as shown in Figs. 8 and 9. It will be seen with these connections the fuses 7 are interposed between the meter and the line.

When it is desired to test the meter, the short circuiting connector of Fig. 5 is applied to the block, as shown in Figs. 1 and 2, so as to connect the two outside terminals of the first series together, and the two inside terminals of the first series together, and thereby short circuiting the meter and by the fuses 16 and 20, fusing both sides of the load circuit independently of the fuses 7, 7. The screw clips connecting the upper ends of the conductors 8 are then loosened until the conductors 8 are removed from their second series terminals, as shown in Fig. 3. The test terminal plug is then applied to the contact surfaces of the terminals from which the terminals 8 have just been removed, and the test circuit 26 being connected to the terminals 22, 22 is thereby placed in series with the series coil of the meter 25. If desired the test plug may be applied before the spring conductors 8 are disconnected, either course being permissible. With the parts so arranged the tests may be completed, and after the test, the circuit can be restored to normal condition by retracing the steps above enumerated.

The connections for a full potential three-wire meter, that is, a three-wire meter with the potential coil across the outside mains, is the same, the neutral wire being disregarded for testing purposes. As is well understood, however, the test circuits must be of proper voltages.

When used with half potential three-wire meters (in which the potential coil is connected to the neutral wire) I use a supplemental block 26, (Figs. 7 and 9) having a ridge 26' and two supplemental terminals 27, 27', provided respectively with supplemental contact surfaces or blades 28, 28', and with two clips 29 on opposite sides of each surface 28, 28'. These terminals are connected by a fuse 30 connected to the inner clips 29. This supplemental block is secured adjacent to one side of the regular block, as shown in Fig. 9, one of the supplemental terminals being in line with the first series of terminals and the other supplemental terminal being in line with the second series of terminals. The potential coil of the meter is connected to the outer clip of the supplemental terminal in line with the second series of terminals, and the neutral main is connected with the outer clip of the supplemental terminal in line with the first series of terminals. The other connections for the line and load circuits and for the meter are the same as above described in connection with Fig. 8.

When it is desired to test a meter 25', with the connection shown in Fig. 9, the short circuiting connector is first applied as above described. One of the fuses 7 is then disconnected from one of its terminals. The connecting member 31 of Fig. 6 is then applied to the supplemental contact surfaces 28', and the contact surface of the terminal from which a fuse 7 has been disconnected, thereby connecting the meter coil with the neutral main through the fuse 30. The test connection plug is then applied, as above described, the two conductors 8 being disconnected from their second series terminals immediately after the short circuiting connector has been applied to the first series terminals. With this arrangement the two series coils of the meter, both properly fused, are placed in series with the testing circuit, so as to be in proper relation for test. After the test is completed, the connecting member is first removed, and thereupon the fuses 7 and conductors 8 are returned to their places, and the test plug removed. Thereafter the short circuiting member is removed from the first series of terminals, thus restoring the circuits to normal condition. The procedure in testing two-wire meters and three-wire full potential meters (without the supplemental block) is precisely the same, and as the connections are all exposed, it is easy to see what is being done. The same steps are performed in testing three-wire half potential meters where the supplemental block is used, there being in addition two simple steps in making the test. The desired simplicity and uniformity of procedure is, therefore, attained.

Where the line wires come from the right and the load wires frm the left, the fuses 7 are shifted to the two right hand channels and the conductors 8 to the two left hand channels to avoid crossing of conductors, suitable extra screw-threaded holes being provided where the fuses and conductors are of different lengths. Where in such case the supplemental block is used it also is put on the right of the block 7, the two similar supplemental terminals permitting it to be turned end for end so as to bring its projection on the outside and yet having a contact surface bearing terminal in line with the second series of terminals.

Various modifications of the embodiment of my invention may be made without departing from its spirit, or from the subject matter claimed herein, as will be evident to those skilled in the art. The forms shown are, however, the preferred forms for testing meters of the several types referred to.

What I claim is:—

1. In a device of the character described, the combination of an insulating base, a first series of four terminals mounted thereon adjacent to one end thereof, a second series of four terminals mounted on said base adjacent to its opposite end, said terminals of said first series having projecting contact surfaces, and each terminal of both series having two connection clips, two fuses connected to clips on each of two pairs of terminals respectively, and two spring conductors connected to clips on each of the other pairs of terminals respectively, said contact surfaces being between the said clips on their respective terminals.

2. In a device of the character described, the combination of an insulating base, a first series of four terminals mounted thereon adjacent to one end thereof, a second series of four terminals mounted on said base adjacent to its opposite end, said terminals of said first series having projecting contact surfaces, and each terminal of both series having two connection clips, two fuses connected to clips on each of two pair of terminals respectively, and two spring conductors connected to clips on each of the other pairs of terminals respectively, said fuses being on one part of said block and said spring conductors on the other part thereof.

3. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, and two conductors connected to clips on each of the other pairs of terminals respectively, said base having four depressed channels within each of which one pair of said terminals is located.

4. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, and two spring conductors connected to clips on each of the other pairs of terminals respectively, said fuses being on one side of said base, and said spring conductors being on the other side thereof, said base having four depressed channels, in each of which is located one pair of said terminals.

5. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, and two conductors connected to clips on each of the other pairs of terminals respectively, the terminals of the said second series to which said conductors are connected each having a contact surface, the said contact surface being between the clips on these terminals.

6. In a device of the character described, the combination of an insulating base, a first series of four terminals mounted thereon adjacent to one end thereof, a second series of four terminals mounted on said base adjacent to its opposite end, said terminals of said first series having projecting contact surfaces, and each terminal of both series having two connection clips, two fuses connected to clips on each of two pairs of terminals respectively, and two conductors connected to clips on each of the other pairs of terminals respectively, the terminals of said second series each having a projecting contact surface.

7. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, and two conductors connected to clips on each of the other pairs of terminals respectively, said fuses being on one side of said base, and the conductors on the other side and the terminals of said second series also having contact surfaces.

8. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, two conductors connected to clips on each of the other pairs of terminals respectively, said fuses being on one side of said base, and the conductors on the other side, and the terminals of said second series also having contact surfaces, a supplemental base and two supplemental terminals thereon, one of said supplemental terminals having a contact surface, adjacent to one of the contact surfaces of one of said second series terminals to which a fuse is connected, and a fuse connecting said supplemental terminals.

9. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, and two conductors connected to clips on each of the other pairs of terminals respectively, said fuses being on one side of said base, and the conductors on the other side, and the terminals of said second series also having contact surfaces, a supplemental base and two supplemental terminals thereon, in line with said two series of terminals respectively, each of said supplemental terminals being provided with a contact surface and two clips, and a fuse connecting said supplemental terminals.

10. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively and two conductors connected to clips on each of the other pairs of terminals respectively, and a removable connector having two insulated conductors, each engaging two different contact surfaces on said first series of terminals.

11. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses connected to clips on each of two pairs of terminals respectively, two separable conductors connected to clips on each of the other pairs of terminals respectively, the terminals of the said second series to which said conductors are connected each having contact surfaces, a removable connector having two insulated conductors each engaging two different contact surfaces on said first series of terminals, a test plug having two terminals thereon insulated from one another and engaging the contact surfaces of the two second series terminals to which said separable conductors are connected, and a test circuit having its ends connected to the terminals on said test plug.

12. In a device of the character described, the combination of an insulating base, a first series of four terminals mounted thereon adjacent to one end thereof, a second series of four terminals mounted on said base adjacent to its opposite end, said terminals of said first series having contact surfaces, and each terminal of both series having two connection clips, two fuses adapted to be connected to clips on each of two pairs of terminals respectively, two separable conductors adapted to be connected to clips on each of the other pairs of terminals respectively, the terminals of said second series each having a contact surface, a supplemental base, two terminals thereon, one in line with said second series and having a contact surface, a removable connector having two insulated conductors each in engagement with two different contact surfaces on said first series of terminals, a test plug having two terminals insulated from one another, and engaging the surfaces on the second series terminals to which said separable conductors are adapted to be connected and a removable clip electrically connecting said supplemental terminal contact surface and an adjacent contact surface on a terminal of said second series.

13. In a device of the character described, the combination of an insulating base, a first series of four terminals mounted thereon adjacent to one end thereof, a second series of four terminals mounted on said base adjacent to its opposite end, said terminals each having a contact surface, clips on the opposite ends of said terminals, two fuses connecting respectively the two pairs of terminals on one side of said block, two spring conductors adapted to connect respectively clips on the other pairs of terminals, a removable connector having two insulated conductors each in engagement with two different contact surfaces on the terminals of the first series, and a removable test circuit plug having two terminals insulated from one another and engaging the contact surfaces on the terminals of the second series to which said spring conductors are adapted to be connected.

14. In a device of the character described, the combination of an insulating base, a first series of four terminals mounted thereon adjacent to one end thereof, a second series of four terminals mounted on said base adjacent to its opposite end, said terminals each having a contact surface, clips on the opposite ends of said terminals, two fuses connecting respectively the two pairs of terminals on one side of said block, two spring conductors adapted to connect respectively clips on the other pairs of terminals, a removable connector having two insulated conductors each in engagement with two different contact surfaces on the terminals of the first series, and a removable test circuit plug having two terminals insulated from one another and engaging the contact surfaces on the terminals of the second series to which said spring conductors are adapted to be connected, and a meter having four terminals connected respectively to clips on said four second series terminals.

GRANVILLE E. PALMER.

Witnesses:
LILLIAN S. JAMES,
IDA M. HUNZIKER.